(12) United States Patent
Fukumoto et al.

(10) Patent No.: US 9,248,723 B2
(45) Date of Patent: Feb. 2, 2016

(54) SLIDE DOOR APPARATUS FOR VEHICLE

(71) Applicant: AISIN SEIKI KABUSHIKI KAISHA, Kariya-shi (JP)

(72) Inventors: Ryoichi Fukumoto, Nagoya (JP); Tomohide Kato, Toyoake (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 17 days.

(21) Appl. No.: 14/224,706

(22) Filed: Mar. 25, 2014

(65) Prior Publication Data

US 2014/0292037 A1      Oct. 2, 2014

(30) Foreign Application Priority Data

Mar. 27, 2013   (JP) ................................. 2013-066807

(51) Int. Cl.
*B60J 5/00*   (2006.01)
*B60J 5/06*   (2006.01)
*E05B 77/54*  (2014.01)

(52) U.S. Cl.
CPC ... *B60J 5/06* (2013.01); *E05B 77/54* (2013.01)

(58) Field of Classification Search
CPC .................................. B60J 5/06; E05B 77/54
USPC .................... 296/202, 155; 49/460; 29/401.1
See application file for complete search history.

(56) References Cited

U.S. PATENT DOCUMENTS 6,328,374 B1 *  12/2001  Patel ............................ 296/155
2013/0205671 A1   8/2013  Ito et al.

FOREIGN PATENT DOCUMENTS

EP      1362730 A1     11/2003
JP      2003-335136 A  11/2003

* cited by examiner

*Primary Examiner* — Joseph D Pape
*Assistant Examiner* — Dana Ivey
(74) *Attorney, Agent, or Firm* — Buchanan Ingersoll & Rooney PC

(57) ABSTRACT

A slide door apparatus includes a body-side guide rail provided at a vehicle body, a door-side guide rail provided at a slide door, connection members each of which includes a guide roller rolling on a path formed by each of the guide rails, each of the connection members being connected to each of the guide rails, the slide door being configured to open and close a door opening portion formed at the vehicle body based on a movement of the slide door, facing portions formed at the slide door and the vehicle body respectively, the facing portions facing each other in a state where the slide door is in a fully open position, and a widthwise displacement restraint mechanism restricting a relative movement between the facing portions of the slide door and the vehicle body in a width direction of the vehicle by connecting the facing portions to each other.

8 Claims, 10 Drawing Sheets

SLIDE DOOR APPARATUS FOR VEHICLE

CROSS REFERENCE TO RELATED APPLICATIONS

This application is based on and claims priority under 35 U.S.C. §119 to Japanese Patent Application 2013-066807, filed on Mar. 27, 2013, the entire content of which is incorporated herein by reference.

TECHNICAL FIELD

This disclosure generally relates to a slide door apparatus for a vehicle.

BACKGROUND DISCUSSION

A known slide door apparatus for a vehicle includes a guide rail extending in a front-rear direction, i.e., a longitudinal direction, of a vehicle and a connection member including a guide roller that is configured to roll on a path formed by the guide rail. A slide door is supported at a vehicle body via the guide rail and the connection member so as to open and close a door opening portion of the vehicle formed at a side surface of the vehicle body based on a longitudinal movement of the slide door along the guide rail.

In addition, the aforementioned guide rail may include a body-side guide rail formed at the side surface of the vehicle body and a door-side guide rail formed at an inner side surface of the slide door.

For example, a slide door apparatus for a vehicle disclosed in JP2003-335136A, which will be hereinafter referred to as Reference 1, includes a first body-side guide rail at a lower position than a window portion of the vehicle formed by the slide door, and a second body-side guide rail at a lower edge of the door opening portion. The slide door apparatus further includes first and second door-side guide rails at positions facing the first and second body-side guide rails.

The guide rail is normally formed at the vehicle body, however, the guide rail is also formed at the inner side surface of the slide door to improve arrangement flexibility of the guide rail and the connection member connected thereto. As a result, according to the slide door apparatus disclosed in Reference 1, a window frame of a window glass forming the window portion may be omitted.

According to the slide door apparatus disclosed in Reference 1, however, a possibility of decrease in rigidity for supporting the slide door (i.e., support rigidity) caused by arrangement change of the guide rail may not be fully eliminated. Such decrease of support rigidity become noticeable as swing or shaky movement of the slide door, which may lead to decrease in quality feeling of the slide door apparatus.

A need thus exists for a slide door apparatus for a vehicle which is not susceptible to the drawback mentioned above.

SUMMARY

According to an aspect of this disclosure, a slide door apparatus for a vehicle includes a body-side guide rail provided at a side surface of a vehicle body, a door-side guide rail provided at a slide door, connection members each of which includes a guide roller rolling on a path formed by each of the body-side guide rail and the door-side guide rail, each of the connection members being connected to each of the body-side guide rail and the door-side guide rail, the slide door being supported at the vehicle body via the body-side guide rail, the door-side guide rail, and the connection members to be configured to open and close a door opening portion formed at the side surface of the vehicle body based on a movement of the slide door in a front-rear direction of a vehicle along each of the body-side guide rail and the door-side guide rail, facing portions formed at the slide door and the vehicle body respectively, the facing portions facing each other in a state where the slide door is in a fully open position, and a widthwise displacement restraint mechanism restricting a relative movement between the facing portions of the slide door and the vehicle body in a width direction of the vehicle by connecting the facing portions of the slide door and the vehicle body to each other.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
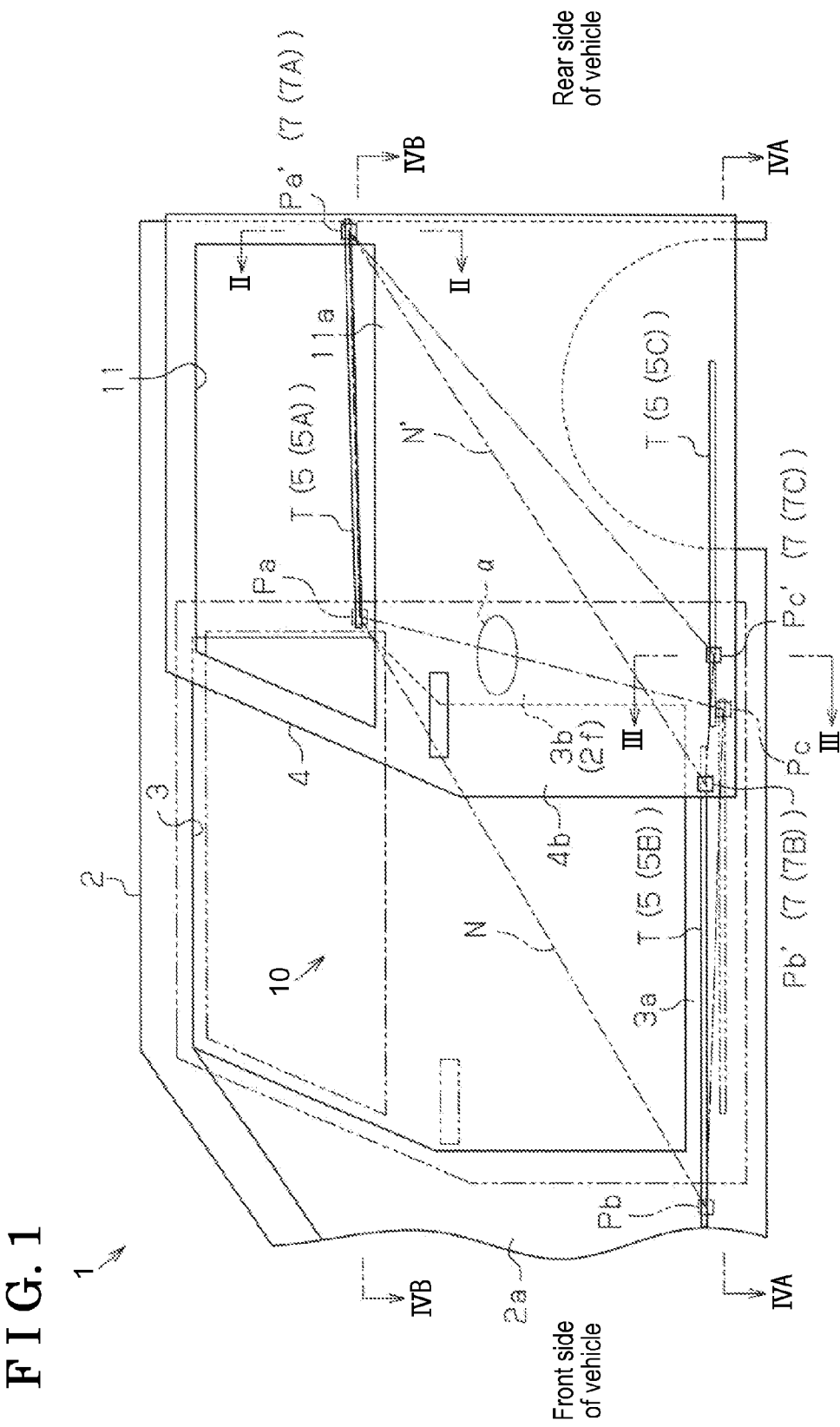
FIG. 1 is a schematic view of a slide door apparatus for a vehicle according to an embodiment disclosed here.

A slide door apparatus for a vehicle according to an embodiment will be explained with reference to the attached drawings. As illustrated in FIG. 1, a vehicle 1 includes a slide door 4 that is movable in a front-rear direction of the vehicle 1 to open and close a door opening portion 3 formed at a side surface 2a of a vehicle body 2.

The vehicle 1 is equipped with a slide door apparatus 10 that includes plural guide rails 5 extending in the front-rear direction of the vehicle 1 and connection members 7 connected to the respective guide rails 5 to be relatively movable in a direction where each of the guide rails 5 extends. The slide door 4 is supported at the vehicle body 2 via the guide rails 5 and the connection members 7 so as to open and close the door opening portion 3 formed at the side surface 2a of the vehicle body 2 by moving in the front-rear direction of the vehicle 1.

Specifically, the plural guide rails 5 of the slide door apparatus 10 in the embodiment are constituted by first and second body-side guide rails 5A and 5B provided at the side surface 2a of the vehicle body 2, and a door-side guide rail 5C provided at an inner side surface 4a of the slide door 4. The connection members 7 of the slide door apparatus 10 in the embodiment are constituted by first and second door-side connection members 7A and 7B provided at the slide door 4 to be connected to the first and second body-side guide rails 5A and 5B, and a body-side connection member 7C provided at the side surface 2a of the vehicle body 2 to be connected to the door-side guide rail 5C.

In the embodiment, the first body-side guide rail 5A serving as a center rail is arranged at a rear side of the door opening portion 3 and at a substantially center portion in a vertical direction of the vehicle 1. The second body-side guide rail 5B serving as a body-side lower rail is provided at a lower edge 3a of the door opening portion 3 to be arranged at a lower side of the first body-side guide rail 5A. The door-side guide rail 5C serving as a door-side lower rail is provided at a lower edge portion of the slide door 4 to be arranged at a lower side of the second body-side guide rail 5B.

The first door-side connection member 7A connected to the first body-side guide rail 5A is provided at a position corresponding to a lower edge 11a of a window portion 11 formed by the slide door 4 at a rear end portion of the slide door 4. The second door-side connection member 7B connected to the second body-side guide rail 5B is arranged at a front lower end portion of the slide door 4. The body-side connection member 7C connected to the door-side guide rail 5C is arranged at a position corresponding to a rear end portion 3b of the door opening portion 3 at a lower portion thereof.

Figure 2:
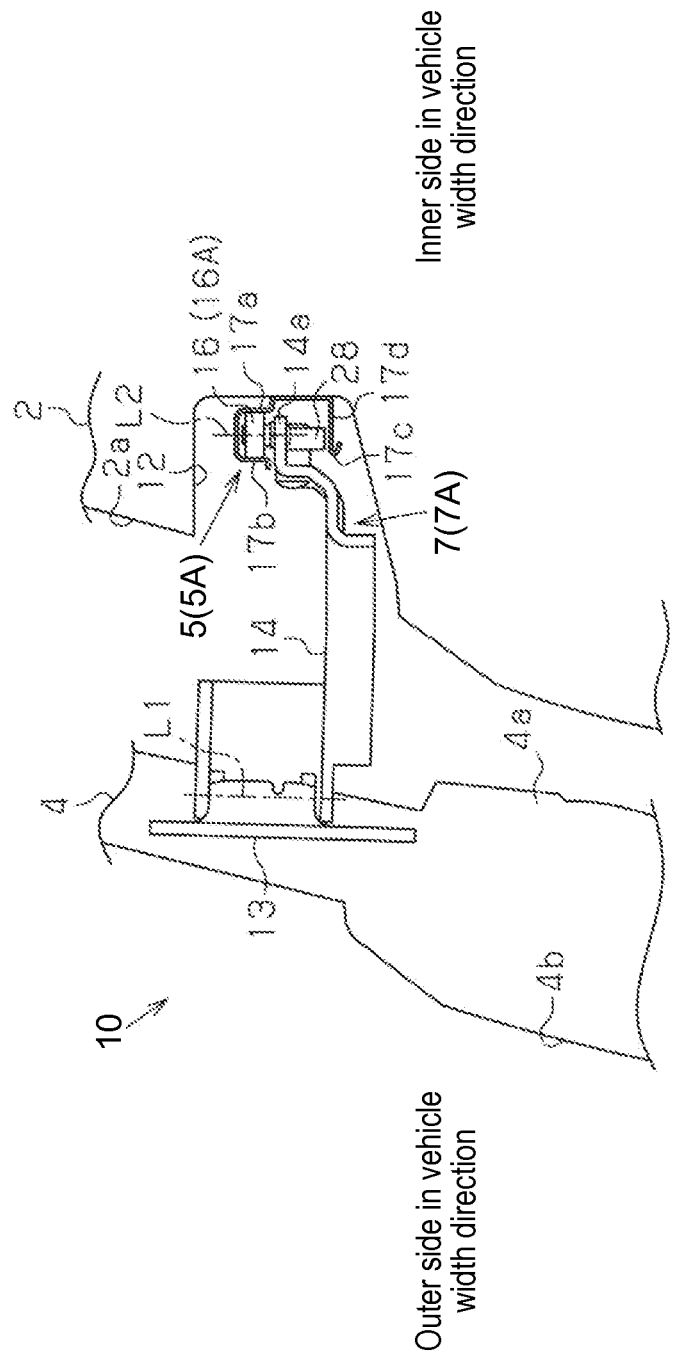
FIG. 2 is a cross-sectional view taken along line II-II in FIG. 1 illustrating configurations of a first body-side guide rail and a first door-side connection member.

Specifically, as illustrated in FIG. 2, the first body-side guide rail 5A is arranged within a recess portion 12 in a groove form. The recess portion 12 is formed at the side surface 2a of the vehicle body 2 so as to extend in the front-rear direction of the vehicle 1 (i.e., in a direction orthogonal to a plane of paper in which FIG. 2 is illustrated). The first door-side connection member 7A connected to the first body-side guide rail 5A includes a bracket 13 fixed to the slide door 4 and a support arm 14 including a support axis L1 that extends in the vertical direction. The support arm 14 is rotatably supported at the bracket 13. A guide roller 16, specifically, a first guide roller 16A is provided at an end portion 14a of the support arm 14 so that the first guide roller 16A is configured to roll on a path T formed by the first body-side guide rail 5A.

The first body-side guide rail 5A includes a pair of side wall portions 17a and 17b opposed in a width direction of the vehicle 1 corresponding to right and left directions in FIG. 2. The first guide roller 16A is rotatably supported at a support axis L2 that extends in the vertical direction. An opening portion 17c is formed at the first body-side guide rail 5A so that the end portion 14a of the support arm 14 may be inserted into the opening portion 17c.

The first door-side connection member 7A is connected to the first body-side guide rail 5A in a state where the first guide roller 16A is sandwiched and disposed between the side wall portions 17a and 17b. The first guide roller 16A makes contact with either the side wall portion 17a or 17b to thereby form the path T at either the side wall portion 17a or 17b. The first door-side connection member 7A is movable along the extending direction of the first body-side guide rail 5A in a state where the first guide roller 16A rolls on the path T.

Figure 3:
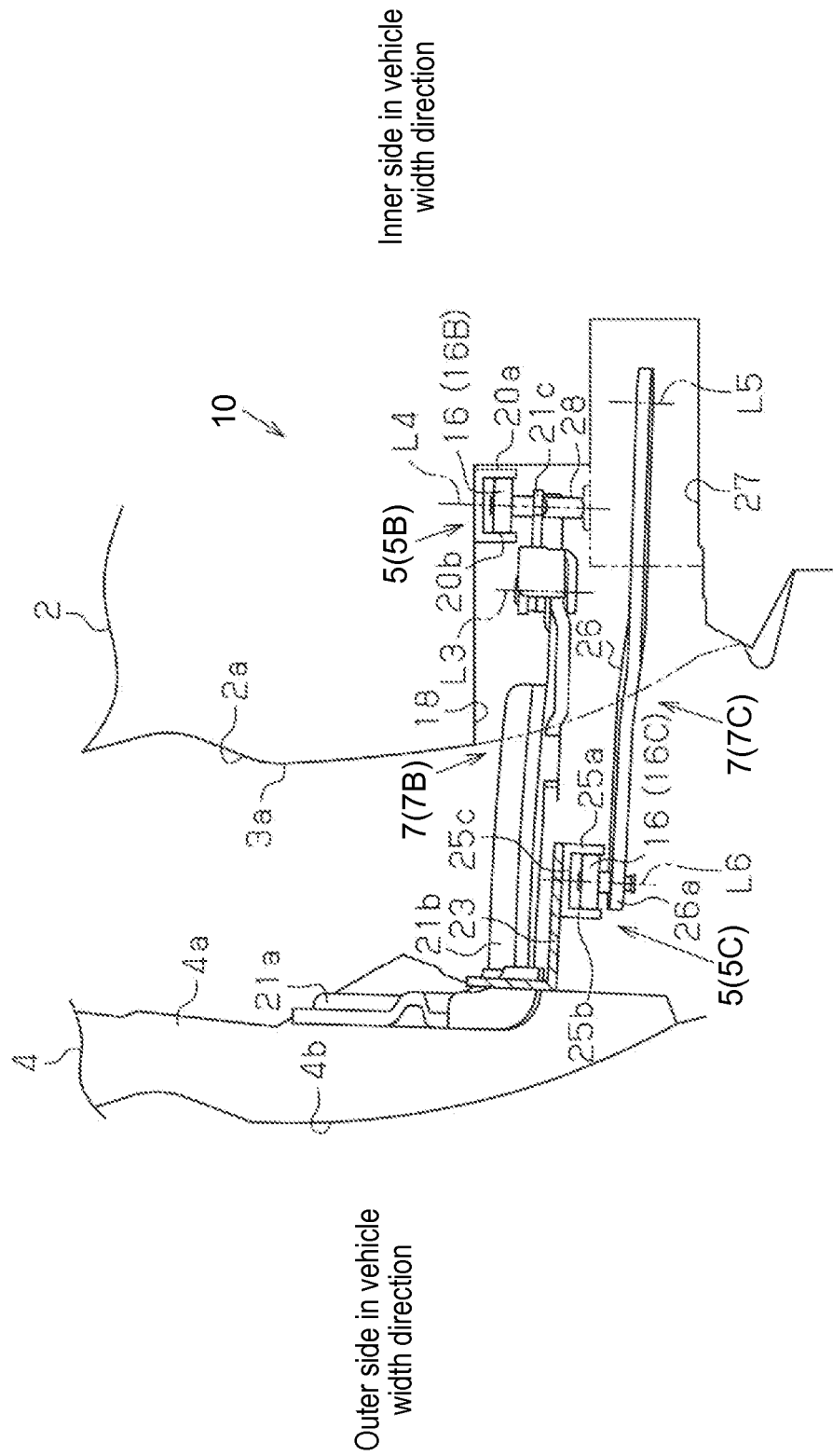
FIG. 3 is cross-sectional view taken along line III-III in FIG. 1 illustrating configurations of a second body-side guide rail, a second door-side connection member, a door-side guide rail, and a body-side connection member.

In addition, as illustrated in FIG. 3, a recess portion 18 in a groove form is formed at the lower edge 3a of the door opening portion 3 so as to extend in the vehicle front-rear direction (i.e., in a direction orthogonal to a plane of paper in which FIG. 3 is illustrated). The second body-side guide rail 5B is arranged within the recess portion 18.

The second body-side guide rail 5B includes a pair of side wall portions 20a and 20b opposed in the width direction of the vehicle 1 corresponding to the right and left directions in FIG. 3. The second body-side guide rail 5B includes a substantially U-shape cross section opening downward. The second door-side connection member 7B connected to the second body-side guide rail 5B includes a fixation portion 21a fixed to the slide door 4 and an arm portion 21b extending inwardly in the width direction of the vehicle 1 (i.e., extending to a right side in FIG. 3). A roller holding portion 21c including a support axis L3 that extends in the vertical direction is rotatably connected to an end of the arm portion 21b. The guide roller 16, specifically, a second guide roller 16B including a support axis L4 that extends in the vertical direction, is provided at the roller holding portion 21c so that the second guide roller 16B is configured to roll on the path T formed by the second body-side guide rail 5B.

The second door-side connection member 7B is connected to the second body-side guide rail 5B in a state where the second guide roller 16B provided at the roller holding portion 21c is sandwiched and disposed between the side wall portions 20a and 20b. The second guide roller 16B rolls on the path T formed at each of the side wall portions 20a and 20b to be movable along the extending direction of the second body-side guide rail 5B.

The door-side guide rail 5C includes a pair of side wall portions 25a and 25b opposed in the width direction of the vehicle 1 so as to include a substantially U-shape cross section opening downward. The door-side guide rail 5C is supported at a bracket 23 that includes a substantially L-shape cross section so that the door-side guide rail 5C is fixed to the inner side surface 4a of the slide door 4.

The body-side connection member 7C connected to the door-side guide rail 5C includes a support arm 26 including a support axis L5 that extends in the vertical direction and being rotatably supported at the vehicle body 2. In the embodiment, a recess portion 27 is formed at the side surface 2a of the vehicle body 2 at a lower side of the recess portion 18 at which the second body-side guide rail 5B is arranged. The guide roller 16, specifically, a third guide roller 16C including a support axis L6 that extends in the vertical direction, is provided at an end portion 26a of the support arm 26 so that the third guide roller 16C is configured to roll on the path T formed by the door-side guide rail 5C.

The body-side connection member 7C is connected to the door-side guide rail 5C in a state where the third guide roller 16C provided at the end portion 26a of the support arm 26 is sandwiched and disposed between the side wall portions 25a and 25b. The third guide roller 16C rolls on the path T formed at each of the side wall portions 25a and 25b to be apparently movable along the extending direction of the door-side guide rail 5C.

Figure 4A:
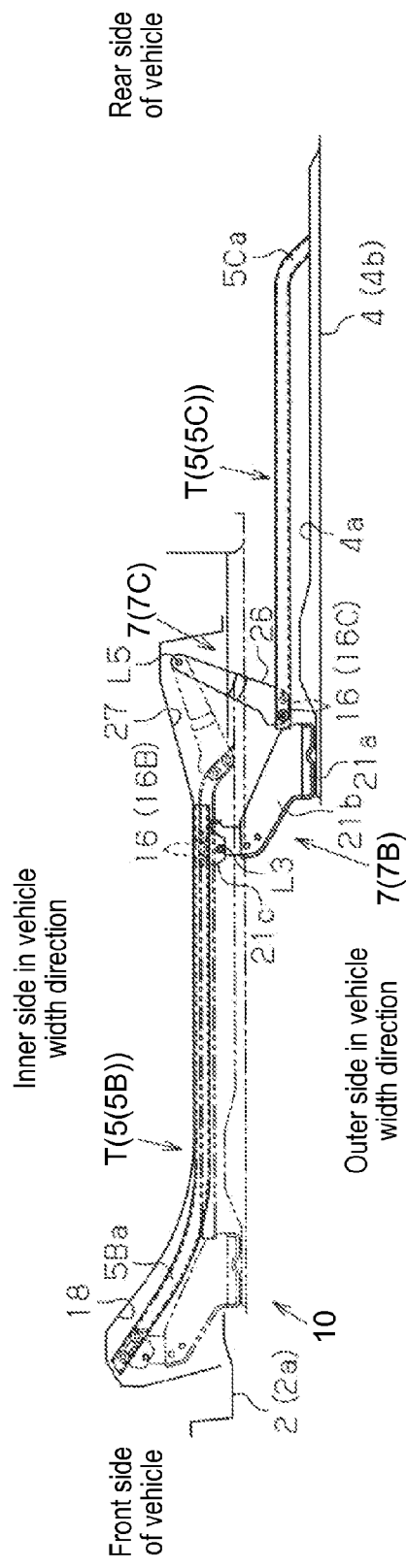
FIG. 4A is a cross-sectional view taken along line IVA-IVA in FIG. 1 illustrating the configurations of the second body-side guide rail, the second door-side connection member, the door-side guide rail, and the body-side connection member.
Figure 4B:
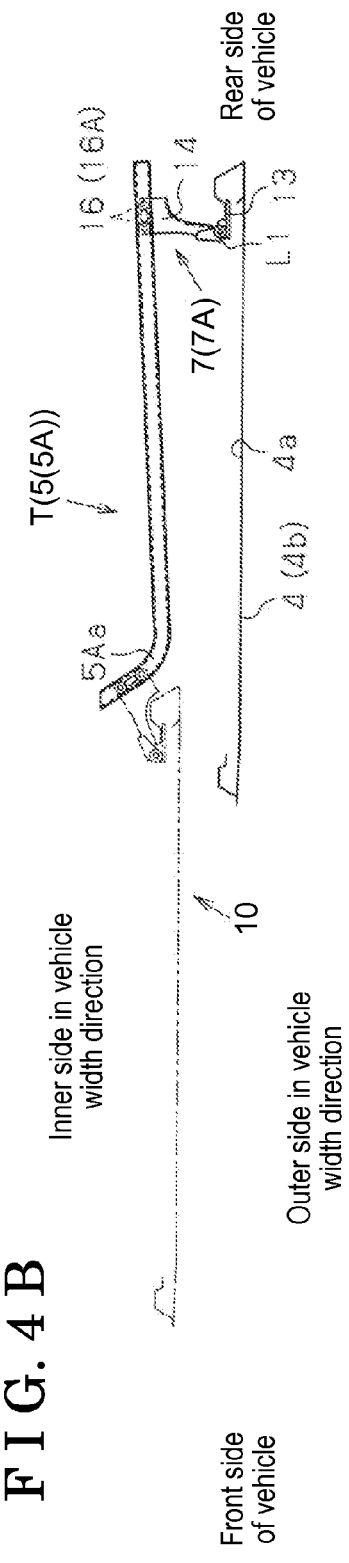
FIG. 4B is a cross-sectional view taken along line IVB-IVB in FIG. 1 illustrating the configurations of the first body-side guide rail and the first door-side connection member.

As illustrated in FIGS. 4A and 4B, in the embodiment, the two guide rollers 16 are provided at each of the connection members 7. In addition, as illustrated in FIG. 2, a road roller 28 is provided at the end portion 14a of the support arm 14 that constitutes the first door-side connection member 7A. The road roller 28 is configured to roll on a lower wall portion 17d of the first body-side guide rail 5A. As illustrated in FIG. 3, the similar road roller 28 is provided at the roller holding portion 21c that constitutes the second door-side connection member 7B. According to the embodiment, the load of the slide door 4 is supported by the aforementioned road rollers 28.

As mentioned above, the slide door 4 is supported at the vehicle body 2 via the guide rails 5, specifically, the guide rails 5A, 5B, and 5C, and the connection members 7, specifically, the connection members 7A, 7B, and 7C. The slide door apparatus 10 is configured to move the slide door 4 in the front-rear direction of the vehicle 1 by a relative movement between each of the guide rails 5A, 5B, and 5C and each of the connection members 7A, 7B, and 7C in a state where each of the guide rollers 16 rolls.

As illustrated in FIG. 4A, a front portion (i.e., a left end portion in FIG. 4A) of the second body-side guide rail 5B provided at the lower edge 3a (see FIG. 1) of the door opening portion 3 is formed by gently curving inwardly in the width direction of the vehicle 1 (i.e., curving upwardly in FIG. 4A).

Specifically, the slide door 4 is arranged so that an outer side surface 4b thereof is coplanar with the side surface 2a of the vehicle body 2 at a fully closed position of the slide door 4 indicated by a chain double-dashed line in FIG. 4A at which the slide door 4 is positioned at a front side in the vehicle 1 by moving along the curved form of the second body-side guide rail 5B, i.e., moving along a curved portion 5Ba thereof. In a case where the slide door 4 moves to a rear side in the vehicle 1 by an opening operation, i.e., to be positioned at a fully open position illustrated by a solid line in FIG. 4A, the slide door 4 is arranged at an outer side in the width direction of the vehicle 1 (i.e., at a lower side in FIG. 4A) so as not to interfere with the side surface 2a of the vehicle body 2.

As illustrated in FIG. 4B, because of dimensional restrictions, it may be difficult to provide a curved form, as gentle as the curved form of the second body-side guide rail 5B, to the first body-side guide rail 5A arranged in the rear of the door opening portion 3. Specifically, a curved portion 5Aa formed at the first body-side guide rail 5A is not as gentle as the curved portion 5Ba of the second body-side guide rail 5B.

In addition, as illustrated in FIG. 4A, a rear portion (i.e., a right end portion in FIG. 4A) of the door-side guide rail 5C may be desired to gently curve outwardly in the width direction (i.e., downwardly in FIG. 4A) in the same way as the curved portion 5Ba of the second body-side guide rail 5B. Nevertheless, because of dimensional restrictions, it may be difficult to provide a curved form, in the same way as the curved portion 5Ba, to the door-side guide rail 5C. Specifically, a curved portion 5Ca formed at the door-side guide rail 5C is not as gentle as the curved portion 5Ba of the second body-side guide rail 5B.

Therefore, according to the embodiment, the support arm 14 that is pivotally supported by the support axis L1 extending in the vertical direction is provided at the first door-side connection member 7A connected to the first body-side guide rail 5A. In the same way, the support arm 26 that is pivotally supported by the support axis L5 extending in the vertical direction is provided at the body-side connection member 7C connected to the door-side guide rail 5C. Then, in the embodiment, at the time of the opening and closing operation of the slide door 4, the support arms 14 and 26 rotate on a basis of a moving position of the slide door 4 so that a displacement of the slide door 4 is allowed in the width direction of the vehicle 1 based on the curved form, i.e., the curved portion 5Ba, of the second body-side guide rail 5B.

Next, a mechanism of restraining the displacement of the slide door in the width direction of the vehicle (i.e., a widthwise displacement restraint mechanism) provided at the slide door apparatus according to the embodiment will be explained.

Figure 5:
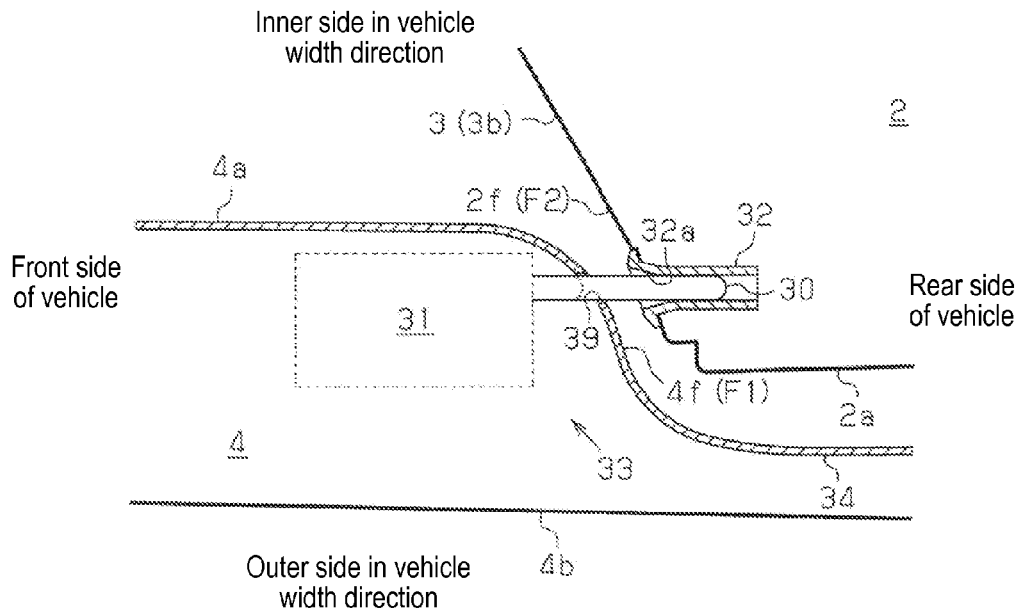
FIG. 5 is a schematic view of a widthwise displacement restraint mechanism according to the embodiment.

As illustrated in FIG. 5, the slide door 4 includes a facing portion 4f facing the rear end portion 3b of the door opening portion 3 in the front-rear direction of the vehicle 1 (corresponding to right and left directions in FIG. 5) in a case where the slide door 4 is in the fully open position. In addition, an engagement member 30 in a shaft form extending in the front-rear direction of the vehicle 1 and an engagement member drive unit 31 configured to drive the engagement member 30 to reciprocate along an axis line thereof are provided at the facing portion 4f. A cylindrical member 32 including an opening portion 32a at the front side (i.e., left side in FIG. 5) and extending in the front-rear direction of the vehicle 1 is provided to be embedded at the rear end portion 3b of the door opening portion 3. Specifically, the cylindrical member 32 is positioned to face a tip end 30b of the engagement member 30. The engagement member drive unit 31 is configured to drive the engagement member 30 provided at the facing portion 4f of the slide door 4 so that the engagement member 30 is inserted and positioned within the cylindrical member 32 in a case where the slide door 4 is in the fully open position.

In the present embodiment, the facing portion 4f provided at the slide door 4 and a facing portion 2f provided at the vehicle body 2 (the rear end portion 3b of the door opening portion 3) are connected to each other on a basis of an engagement relationship between the engagement member 30 and the cylindrical member 32. A relative movement between the facing portion 4f of the slide door 4 and the facing portion 2f of the vehicle body 2 in the width direction of the vehicle 1 (i.e., vertical direction in FIG. 5) is restricted so that the displacement of the slide door 4 in the width direction of the vehicle 1 may be restrained, thereby constituting a widthwise displacement restraint mechanism 33.

Figure 6:
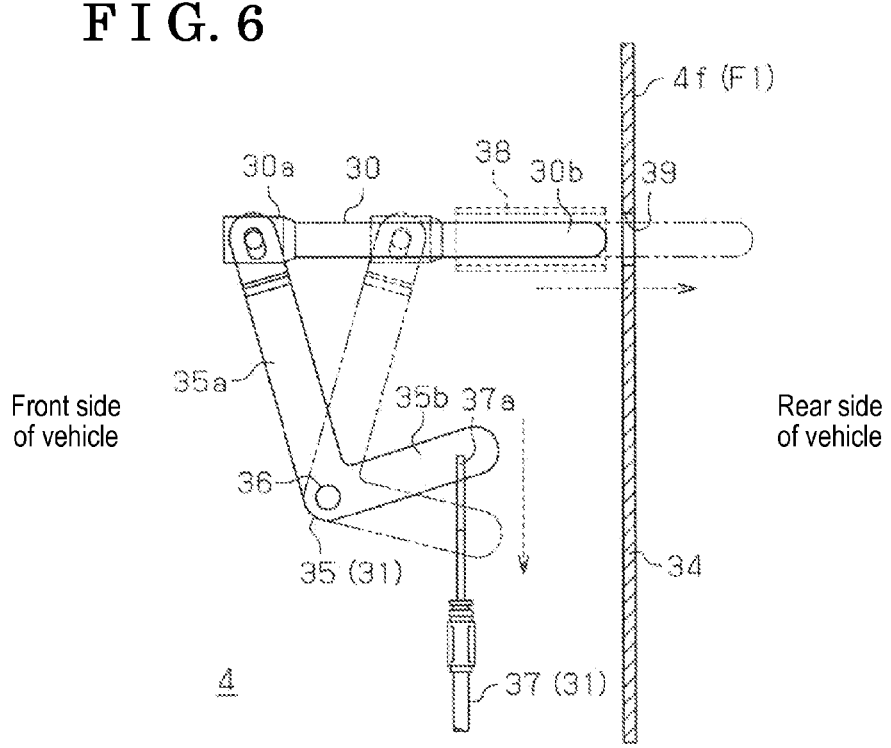
FIG. 6 is a side view of a drive lever constituting a driving portion of an engagement member drive unit according to the embodiment.

As illustrated in FIG. 6, a drive lever 35 serving as a driving portion is pivotally supported by a support shaft 36 that extends in the vehicle width direction (i.e., in a direction orthogonal to a plane of paper in which FIG. 6 is illustrated) at the inside of the slide door 4. Specifically, the drive lever 35 is arranged at the front side (i.e., left side in FIG. 6) of a panel member 34 constituting the facing portion 4f of the slide door 4.

The drive lever 35 includes a first lever portion 35a and a second lever portion 35b to form a substantially L-shape with the support shaft 36 serving as a base end. The drive lever 35 is pivotally supported by the support shaft 36 in a state where the first lever portion 35a is positioned at an upper side of the support shaft 36. A first end portion 37a of a wire cable 37 serving as a transmission member is connected to an end of the second lever portion 35b arranged substantially orthogonal to the first lever portion 35a to extend in the rear direction of the vehicle 1. A base end 30a of the engagement member 30 is connected to an end of the first lever portion 35a.

A guide member 38 in a cylindrical form extending in the front-rear direction of the vehicle 1 is provided within the slide door 4. The tip end 30b of the engagement member 30 is inserted to be positioned within a cylinder portion of the guide member 38. An insertion bore 39 is formed at the panel member 34 at a position facing the guide member 38 so that the engagement member 30 is insertable into the insertion bore 39.

Specifically, the engagement member 30 moves in a reciprocating manner in the vehicle front-rear direction by being guided by the guide member 38 so that the tip end 30b is projectable from the facing portion 4f of the slide door 4, specifically, from the insertion bore 39 formed at the panel member 34. The drive lever 35 rotates in the clockwise direction in FIG. 6 based on a tensile force of the wire cable 37 connected to the second lever portion 35b. As a result, the engagement member 30 connected to the first lever portion 35a moves in the rear direction of the vehicle 1 so that the tip end 30b of the engagement member 30 projects in the rear direction from the facing portion 4f of the slide door 4.

Figure 7:
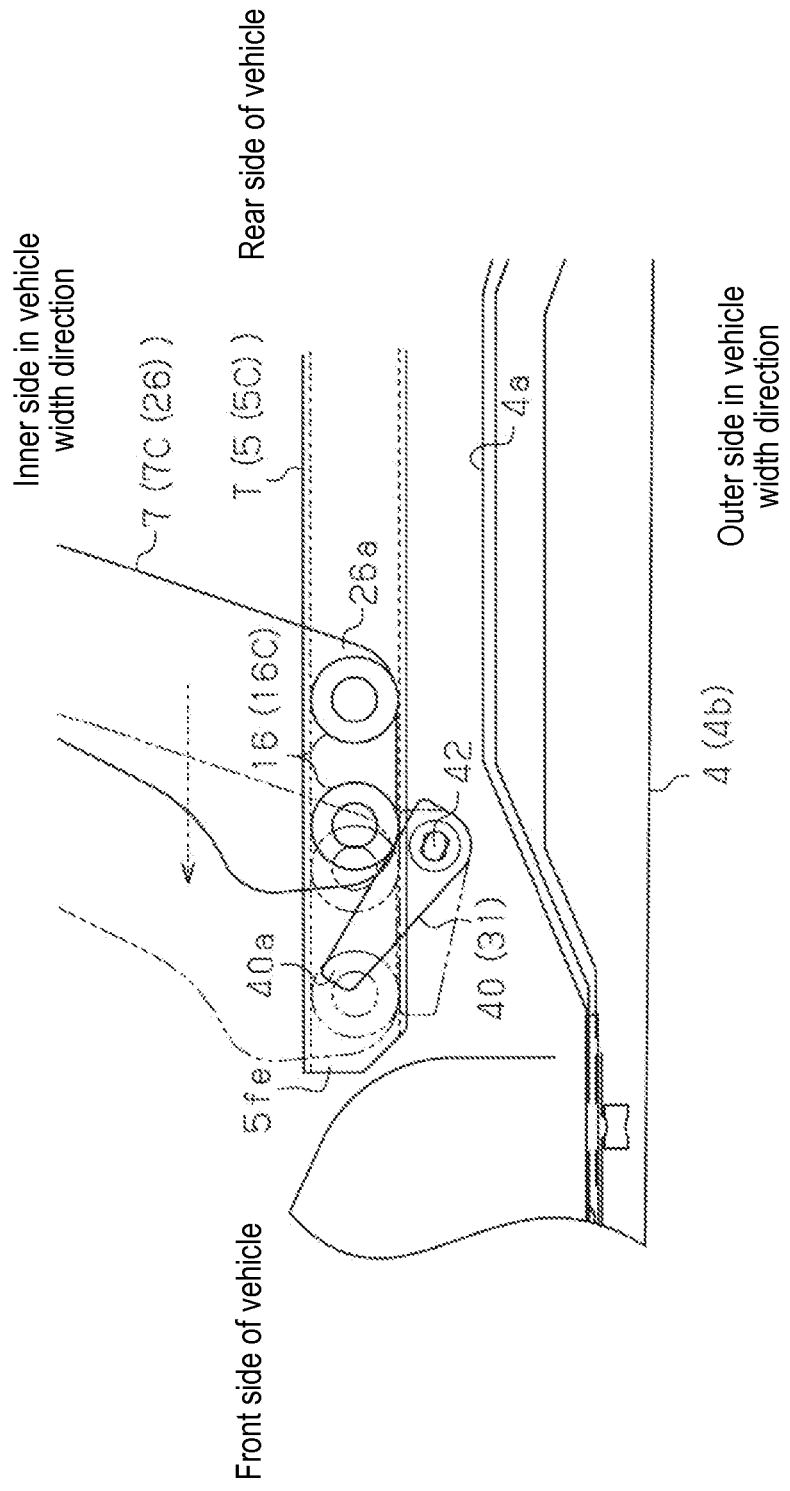
FIG. 7 is a plan view of a pressure-receiving lever constituting a pressure-receiving portion of the engagement member drive unit according to the embodiment.

As illustrated in FIG. 7, a pressure-receiving lever 40 serving as a pressure-receiving portion is provided at the door-side guide rail 5C (see FIG. 4A) that is provided at the inner side surface 4a of the slide door 4. The pressure-receiving lever 40 is pressed against the body-side connection member 7C connected to the door-side guide rail 5C in association with the opening operation of the slide door 4.

Figure 8:
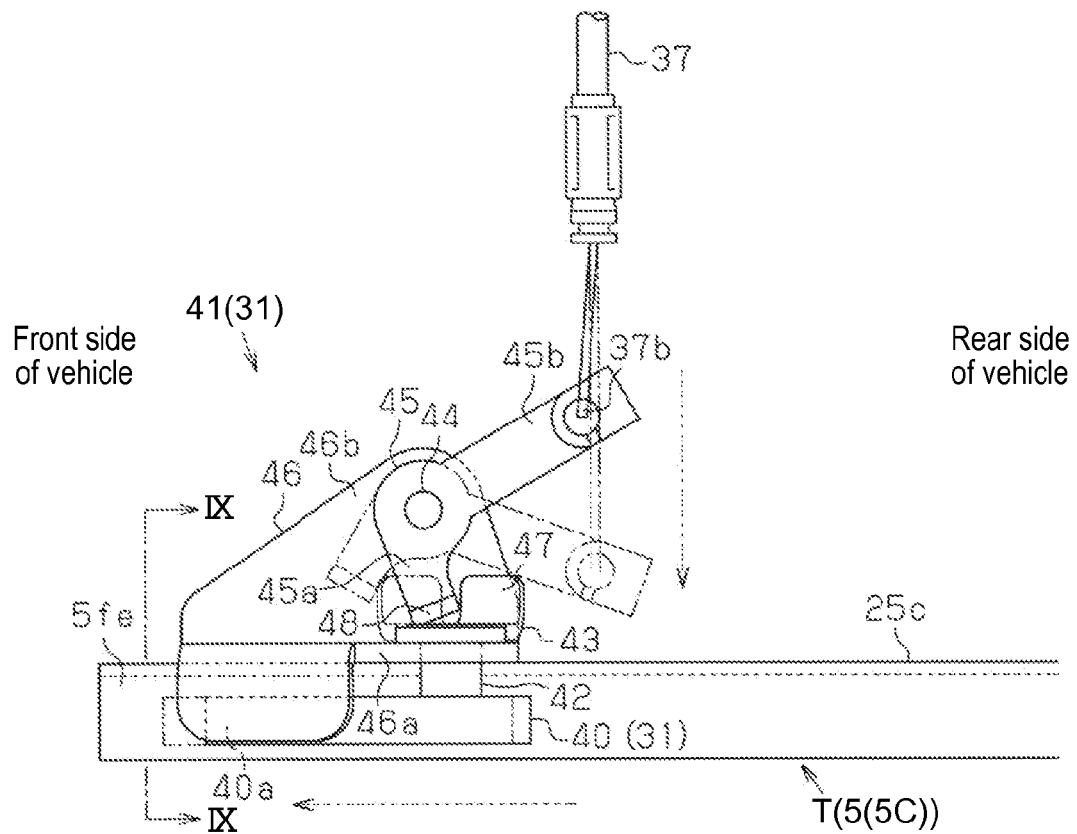
FIG. 8 is a side view of a conversion mechanism constituting the engagement member drive unit according to the embodiment.
Figure 9:
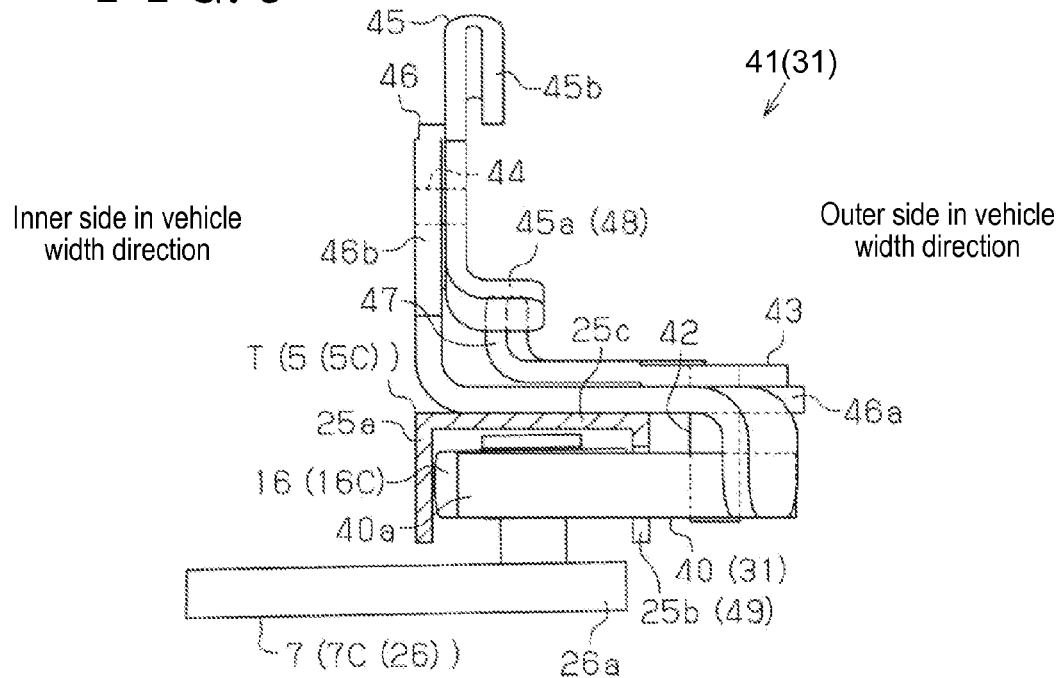
FIG. 9 is cross-sectional view taken along line IX-IX in FIG. 8 illustrating a configuration of the conversion mechanism constituting the engagement member drive unit.

As illustrated in FIGS. 8 and 9, a first conversion lever 43 and a second conversion lever 45 are provided at the door-side guide rail 5C. The first conversion lever 43 includes a rotation shaft 42 that is also serves as a rotation shaft of the pressure-receiving lever 40 so that the first conversion lever 43 integrally rotates with the pressure-receiving lever 40. The second conversion lever 45 is rotatable about a support shaft 44 that is substantially orthogonal to the rotation shaft 42. In the present embodiment, the first conversion lever 43 and the second conversion lever 45 constitute a conversion mechanism 41. Specifically, the conversion mechanism 41 converts a pressing force generated by the body-side connection member 7C that moves relative to the door-side guide rail 5C based on the opening operation of the slide door 4 against the pressure-receiving lever 40 (i.e., a force by which the pressure-receiving lever 40 is pressed) to the tensile force of the wire cable 37 connected to the drive lever 35.

A support bracket 46 including a substantially L-shape cross section is provided upon an upper wall portion 25c of the door-side guide rail 5C including a substantially U-shape cross section opening downward. The rotation shaft 42 of the pressure-receiving lever 40 and the first conversion lever 43, and the support shaft 44 of the second conversion lever 45 are provided at the support bracket 46.

Specifically, as illustrated in FIG. 8, the support bracket 46 is provided at a front end portion 5fe of the door-side guide rail 5C. In addition, as illustrated in FIG. 9, the rotation shaft 42 of the pressure-receiving lever 40 and the first conversion lever 43 is formed to penetrate in the vertical direction through a lateral portion 46a of the support bracket 46. The lateral portion 46a extends to the lateral side of the door-side guide rail 5C, i.e., extends outwardly in the vehicle width direction (right side in FIG. 9). The support shaft 44 of the second conversion lever 45 is formed at a vertical portion 46b of the support bracket 46 extending upwardly from the door-side guide rail 5C.

As illustrated in FIGS. 8 and 9, the pressure-receiving lever 40 is fixed to a lower end portion of the rotation shaft 42 in a state where an end portion 40a of the pressure-receiving lever 40 is positioned to be contactable with the third guide roller 16C provided at the end portion 26a of the support arm 26 constituting the body-side connection member 7C. In the embodiment, a cut portion 49 is formed at a front end of the side wall portion 25b positioned at the outer side in the vehicle width direction. The end portion 40a of the pressure-receiving lever 40 is configured to be inserted into the door-side guide rail 5C via the cut portion 49.

The first conversion lever 43 is fixed to an upper end portion of the rotation shaft 42 in a state to be positioned at an upper side of the support bracket 46. A bending portion 47 bending upwardly in FIG. 9 is formed at an end of the first conversion lever 43.

The second conversion lever 45 includes a first lever portion 45a and a second lever portion 45b forming substantially an L-shape with the support shaft 44 serving as a base end. The second conversion lever 45 is pivotally supported by the support shaft 44 in a state where an end of the first lever portion 45a is positioned at a lower side of the support shaft 44. A bending portion 48 is formed at the end of the first lever portion 45a so as to bend in a direction orthogonal to the vertical portion 46b of the support bracket 46.

The first conversion lever 43 and the second conversion lever 45 are biased in a direction in which the bending portions 47 and 48 make contact with each other by an elastic force of a biasing member, for example, a torsion coil spring. Accordingly, the first conversion lever 43 and the second conversion lever 45 are configured to rotate in conjunction with each other.

The second lever portion 45b of the second conversion lever 45 extends in a direction substantially orthogonal to a direction in which the first lever portion 45a extends. In addition, a second end portion 37b of the wire cable 37 connected to the first lever portion 35a of the drive lever 35 is connected to an end of the second lever portion 45b.

The body-side connection member 7C connected to the door-side guide rail 5C apparently moves on the door-side guide rail 5C based on the opening operation of the slide door 4. Then, the pressure-receiving lever 40 serving as the pressure-receiving portion makes contact with the body-side connection member 7C moving relative to the door-side guide rail 5C to be pressed against the body-side connection member 7C, specifically, the third guide roller 16, which results in the rotation of the pressure-receiving lever 40.

The first conversion lever 43 integrally rotates with the pressure-receiving lever 40 to thereby rotate the second conversion lever 45. In addition, the rotation of the second conversion lever 45 causes the second end portion 37b of the wire cable 37 connected to the second lever portion 45b to be pulled down. As a result, the conversion mechanism 41 may convert the pressing force generated by the body-side connection member 7C against the pressure-receiving lever 40 to the tensile force of the wire cable 37.

In the embodiment, the pressure-receiving lever 40, and the first and second conversion levers 43 and 45 constituting the conversion mechanism 41 are provided at the front end portion 5fe of the door-side guide rail 5C. Thus, at a time when the pressure-receiving lever 40 is pressed against the third guide roller 16C of the body-side connection member 7C, the slide door 4 is already moved to the fully open position. The drive lever 35 drives the engagement member 30 based on the tensile force of the wire cable 37 so that the tip end 30b of the engagement member 30 is inserted to be positioned within the cylindrical member 32 provided at the facing portion 2f of the vehicle body 2, i.e., the rear end portion 3b of the door opening portion 3.

Accordingly, the drive lever 35 serving as the driving portion and the pressure-receiving lever 40 serving as the pressure-receiving portion are connected to each other by the conversion mechanism 41 and the wire cable 37 serving as the transmission member to constitute the engagement member drive unit 31 driving the engagement member 30. In addition, the facing portion 4f of the slide door 4 constitutes a first facing portion F1 and the facing portion 2f of the vehicle body 2 constitutes a second facing portion F2. According to the widthwise displacement restraint mechanism 33 of the embodiment, the facing portion 4f of the slide door 4 and the facing portion 2f of the vehicle body 2 are connected to each other on a basis of the engagement between the engagement member 30 provided at the first facing portion F1 and the cylindrical member 32 serving as an engagement portion provided at the second facing portion F2. As a result, the relative movement between the facing portion 4f of the slide door 4 and the facing portion 2f of the vehicle body 2 is restricted in the width direction of the vehicle 1.

In the slide door apparatus 10 of the embodiment, as illustrated in FIG. 1, the slide door 4 is supported by a connection point Pa (Pa') between the first body-side guide rail 5A and the first door-side connection member 7A, a connection point Pb (Pb') between the second body-side guide rail 5B and the second door-side connection member 7B, and a connection point Pc (Pc') between the door-side guide rail 5C and the body-side connection member 7C. The connection points Pa, Pb, and Pc are obtained in a case where the slide door 4 is in the substantially fully closed position. The connection points Pa', Pb' and Pc' are obtained in a case where the slide door 4 is in the substantially fully open position. A portion (i.e., a connection point α) at which the facing portion 4f of the slide door 4 and the facing portion 2f of the vehicle body 2 are connected by the widthwise displacement restraint mechanism 33 is positioned at an upper side of a line (straight line) N' connecting between the connection points Pa' and Pb' obtained in a state where the slide door 4 is in the fully open position.

The function of the widthwise displacement restraint mechanism 33 including the aforementioned configuration will be explained below. The engagement member 30 provided at the facing portion 4f of the slide door 4 (the first facing portion F1) is inserted to be positioned within the cylindrical member 32 provided at the facing portion 2f of the vehicle body 2 (the second facing portion F2) so that the facing portion 4f of the slide door 4 and the facing portion 2f of the vehicle body 2 are connected to each other in a state where the engagement member 30 in a shaft form extending in the front-rear direction of the vehicle 1 penetrates through the facing portion 4f of the slide door 4 and the facing portion 2f of the vehicle body 2. As a result, the relative movement between the facing portion 4f of the slide door 4 and the facing portion 2f of the vehicle body 2 is restricted in a direction orthogonal to the axis line of the engagement member 30. The displacement of the slide door 4 in the width direction of the vehicle 1 may be restrained accordingly.

According to the embodiment, the following effects may be obtained.

(1) The slide door 4 includes the facing portion 4f that faces the rear end portion 3b of the door opening portion 3 formed at the side surface 2a of the vehicle body 2 in a state where the slide door 4 is in the fully open position. The slide door apparatus 10 includes the widthwise displacement restraint mechanism 33 that may restrain the displacement of the slide door 4 in the vehicle width direction by inhibiting the relative movement between the facing portion 4f of the slide door 4 and the facing portion 2f of the vehicle body 2 (the rear end portion 3b of the door opening portion 3) by the connection thereof.

That is, the increase of the number of connection points between the slide door 4 and the vehicle body 2 may improve a support rigidity of the slide door 4. In addition, in the configuration in which the guide rail 5 is provided at the slide door 4 (i.e., the door-side guide rail 5C), the slide door 4 is likely to displace in the vehicle width direction caused by a lack of support rigidity. Then, at the fully open position at which the slide door 4 is stopped, swing or shaky movement of the slide door 4 caused by the displacement thereof in the vehicle width direction may be noticeable. Nevertheless, according to the aforementioned configuration, the displacement of the slide door 4 in the vehicle width direction may be restrained. As a result, the swing or shaky movement of the slide door 4 is restrained so as to improve a quality feeling thereof.

(2) The slide door apparatus 10 includes the first body-side guide rail 5A provided in the rear of the door opening portion 3, the second body-side guide rail 5B provided at the lower edge 3a of the door opening portion 3, and the door-side guide rail 5C arranged at the lower side of the second body-side guide rail 5B for supporting the slide door 4 at the vehicle body 2. The connection point a at which the facing portion 4f of the slide door 4 and the facing portion 2f of the vehicle body 2 are connected by the widthwise displacement restraint mechanism 33 is positioned above the line N' connecting between the connection points Pa' and Pb' obtained in a state where the slide door 4 is in the fully open position.

According to the aforementioned configuration, the slide door 4 is supported by the three connection points, i.e., the connection point Pa between the first body-side guide rail 5A and the first door-side connection member 7A, the connection point Pb between the second body-side guide rail 5B and the second door-side connection member 7B, and the connection point Pc between the door-side guide rail 5C and the body-side connection member 7C.

At this time, the size of triangle formed by the connection points Pa, Pb, and Pc decreases by the opening operation of the slide door 4. That is, because of the rearward movement of the slide door 4, the connection points Pb and Pc arranged at the lower side in the slide door 4 come closer to each other, which results in the connection points Pb' and Pc'. Accordingly, the slide door 4 may easily swing or move about the line N' connecting the connection points Pa' and Pb'. Such tendency is more noticeable in a state where the slide door 4 is in the fully open position.

According to the aforementioned configuration, the additional connection point, i.e., the connection point α obtained by the widthwise displacement restraint mechanism 33, is provided at an opposite side from the connection point Pc relative to the line N' connecting the connection points Pa' and Pb'. As a result, the swing or shaky movement of the slide door 4 may be effectively restrained.

(3) The first door-side connection member 7A connected to the first body-side guide rail 5A is provided at a position corresponding to the lower edge 11a of the window portion 11 formed by the slide door 4. As a result, a load applied to a portion constituting the window frame of the window portion 11 may be reduced. A design flexibility of the window frame portion may greatly increase, including elimination of the window frame portion. Nevertheless, such layout of the first door-side connection member 7A may not be appropriate for stably supporting the slide door 4. Consequently, the application of the aforementioned configurations (1) and (2) to the slide door apparatus 10 including such support structure may be further effective.

(4) The widthwise displacement restraint mechanism 33 includes the engagement member 30 provided at the facing portion 4f of the slide door 4 and including a shaft form extending in the vehicle front-rear direction, the cylindrical member 32 serving as the engagement portion provided at the facing portion 2f of the vehicle body 2 that constitutes the second facing portion F2, and the engagement member drive unit 31 driving the engagement member 30 to be inserted into the cylindrical member 32.

According to the aforementioned configuration, the facing portion 4f of the slide door 4 and the facing portion 2f of the vehicle body 2 may be securely connected on a basis of the engagement relationship between the engagement member 30 and the cylindrical member 32. As a result, the relative movement between the facing portion 4f of the slide door 4 and the facing portion 2f of the vehicle body 2 in the direction orthogonal to the axis line of the engagement member 30, i.e., in the width direction of the vehicle 1, is restricted to restrain the displacement of the slide door 4 in the vehicle width direction.

(5) The engagement member drive unit 31 includes the drive lever 35 connected to the engagement member 30 and the pressure-receiving lever 40 contacting with and pressed against the body-side connection member 7C that moves relative to the door-side guide rail 5C based on the opening operation of the slide door 4. The engagement member drive unit 31 also includes the conversion mechanism 41 converting the rotation of the pressure-receiving lever 40 based on the pressing force generated by the body-side connection member 7C against the pressure-receiving lever 40 to the tensile force of the wire cable 37. The pressing force by which the pressure-receiving lever 40 is pressed is transmitted to the drive lever 35 via the wire cable 37 so that the engagement member 30 is driven to engage with the cylindrical member 32.

According to the aforementioned configuration, the facing portion 4f of the slide door 4 and the facing portion 2f of the vehicle body 2 may be appropriately and securely connected and disconnected without an electrical structure, for example, a sensor or an actuator. The high reliability may be secured accordingly.

(6) The engagement member 30 is driven by the engagement member drive unit 31 so that the tip end 30b of the engagement member 30 projects from the facing portion 4f of the slide door 4, specifically, from the insertion bore 39 formed at the panel member 34. Accordingly, the engagement member 30 may be avoided to serve as an obstacle at the slide door 4 in a state where the slide door 4 is not in the fully open position. In addition, design property may improve.

(7) The body-side connection member 7C includes the third guide roller 16C rolling on the path T formed by the door-side guide rail 5C, the third guide roller 16C being provided at the end portion 26a of the support arm 26.

Figure 10:
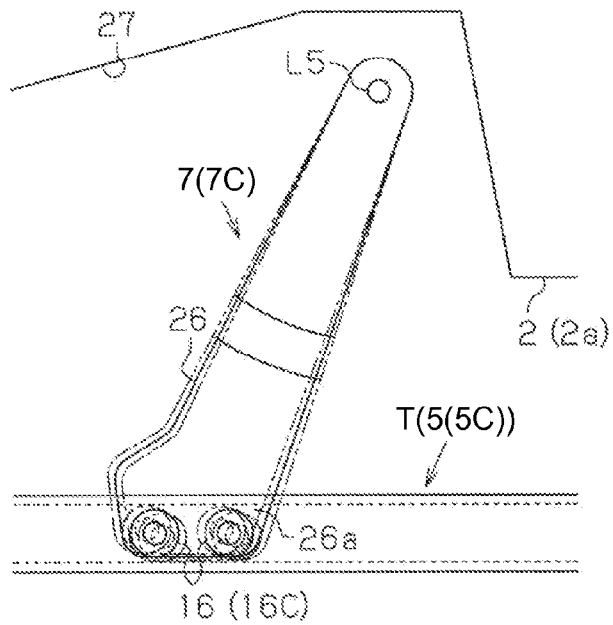
FIG. 10 is a plan view explaining a state in which a small rotation or movement occurs at a support arm at a position at which the support arm is positioned after rotating in association with an opening operation of the slide door according to the embodiment.

In order for each of the guide rollers 16 to smoothly roll on the path T formed by each of the guide rails 5, a clearance needs to be specified and formed between the guide rail 5 and the guide roller 16. Nevertheless, because of such clearance formed as illustrated in FIG. 10, the support arm 26 may slightly rotate even after the support arm 26 completes its rotation based on the displacement of the slide door 4 in the vehicle width direction at the time of the opening operation of the slide door 4. In the configuration in which the guide rail 5 is provided at the slide door 4, (i.e., the door-side guide rail 5C), a small rotation or movement generated at the support arm 26 of the body-side connection member 7C tends to become noticeable as swing or shaky movement of the slide door 4. Consequently, the application of the aforementioned configurations (1) to (6) to the slide door apparatus 10 including such support structure may be further effective.

The aforementioned embodiment may be modified as follows. Specifically, in the embodiment, the slide door apparatus 10 includes the first body-side guide rail 5A provided at the rear side of the door opening portion 3, the second body-side guide rail 5B provided at the lower edge 3a of the door opening portion 3, and the door-side guide rail 5C arranged at the lower side of the second body-side guide rail 5B for supporting the slide door 4. At this time, the numbers and arrangements of the guide rails 5 and the connection members 7 may be appropriately changed.

In the embodiment, the engagement member 30 in a shaft form extending in the vehicle front-rear direction and the engagement member drive unit 31 configured to reciprocate the engagement member 30 along the axis line thereof are provided at the facing portion 4f of the slide door 4. Then, the cylindrical member 32 serving as the engagement portion relative to the engagement member 30 is provided at the facing portion 2f of the vehicle body 2 (the rear end portion 3b of the door opening portion 3). That is, the facing portion 4f of the slide door 4 serves as the first facing portion F1 and the facing portion 2f of the vehicle body 2 serves as the second facing portion F2.

Figure 11:
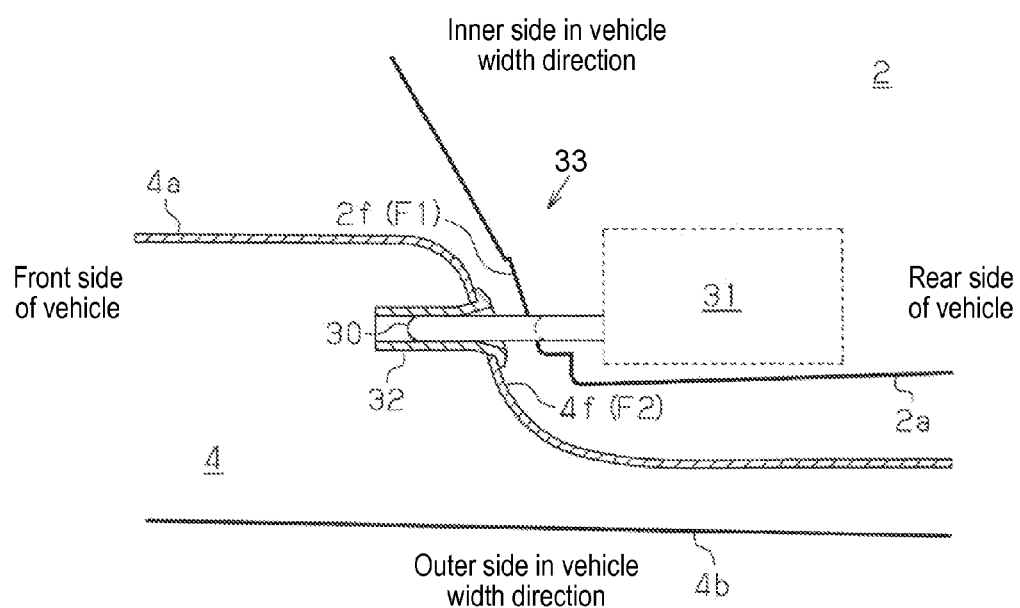
FIG. 11 a schematic view of the widthwise displacement restraint mechanism according to a modified embodiment.

Alternatively, as illustrated in FIG. 11, the engagement member 30 and the engagement member drive unit 31 may be provided at the facing portion 2f of the vehicle body 2 to serve as the first facing portion F1. In addition, the cylindrical member 32 may be provided at the facing portion 4f of the slide door 4 to serve as the second facing portion F2. According to such configuration, the same effect as that of the aforementioned embodiment may be obtained.

Figure 12:
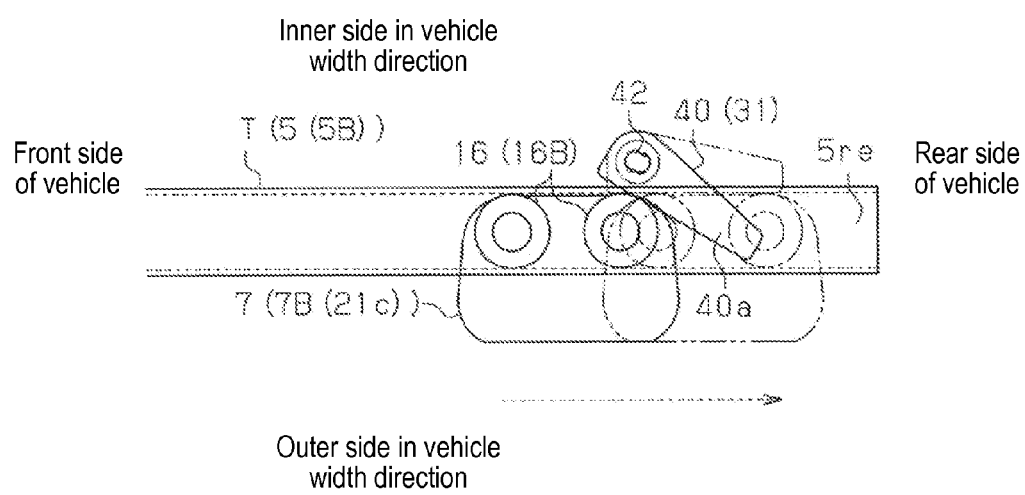
FIG. 12 is a plan view of the pressure-receiving lever of the widthwise displacement restraint mechanism according to the modified embodiment.

In this case, the pressure-receiving lever 40 and the conversion mechanism 41 may be provided at a rear end portion 5re (i.e., right end in FIG. 12) of the second body-side guide rail 5B. Then, the pressure-receiving lever 40 may make contact to be pressed against the second door-side connection member 7B, or the second guide roller 16B thereof or the roller holding portion 21c. Alternatively, the pressure-receiving lever 40 may be provided at the other guide rails 5 than the second body-side guide rail 5B.

In the embodiment, the pressing force by which the pressure-receiving lever 40 is pressed is converted to the tensile force of the wire cable 37 so that the tensile force is transmitted to the drive lever 35 to drive the engagement member 30. Alternatively, the transmission member other than the wire cable 37, for example, a link or a rod, may be used. The configurations of the drive lever 35, the pressure-receiving lever 40, and the conversion mechanism 41 may be appropriately changed.

Figure 13:
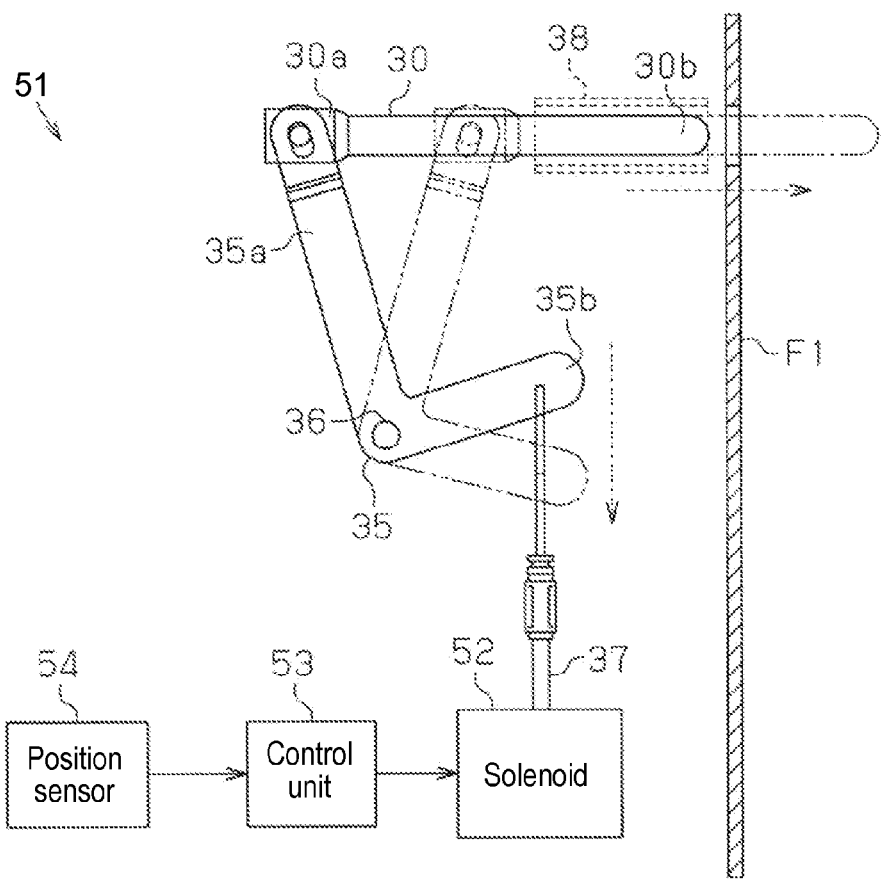
FIG. 13 is a schematic view of an engagement member drive unit according to another modified embodiment.

Further, as illustrated in FIG. 13, an engagement member drive unit 51 including a drive source for driving the drive lever 35 may be provided. Specifically, the engagement member drive unit 51 includes a solenoid 52 serving as the drive source, a control unit 53 controlling the operation of the solenoid 52, and a position sensor 54 detecting the slide door 4 moved to the fully open position. At this time, an electric motor may be used for the drive source. Based on a detection result of the position sensor 54, the operation of the drive lever 35 may be controlled. As a result, the same effect as that of the aforementioned embodiment may be obtained, in addition to a simplification of configurations.

In the embodiment, the engagement member 30 in a shaft form is configured to be inserted to the cylindrical member 32 serving as the engagement portion relative to the engagement member 30. In this case, the shapes and configurations of the engagement member 30 and the engagement portion relative to the engagement member 30 may be appropriately changed. For example, the engagement portion in a projection form and the engagement member including an engagement recess portion may engage with each other. Alternatively, two projections may engage with each other. Further alternatively, a known latch mechanism generating a connection force by engagement between a latch and a striker used for a door locking, for example, may be used.

In the embodiment, the facing portion 4f of the slide door 4 and the facing portion 2f of the vehicle body 2 may face in the vehicle font-rear direction. Alternatively, the facing portions 4f and 2f may face in the vehicle width direction.

In the embodiment, the engagement member 30 reciprocates along the axis line thereof. In this case, however, the operation manner of the engagement member 30 may be appropriately changed.

Figure 14:
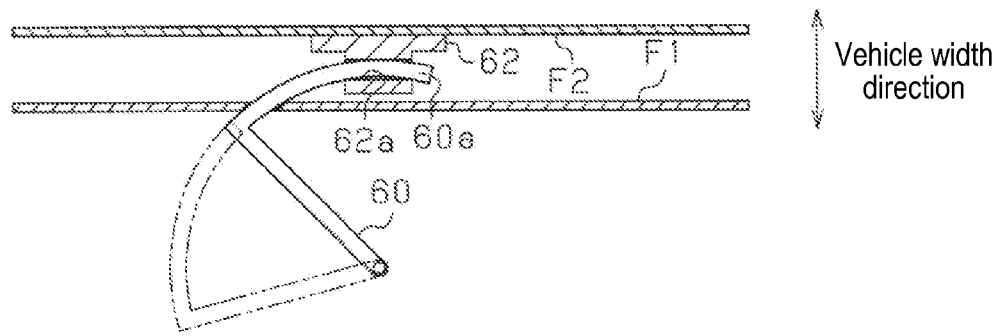
FIG. 14 is a plan view illustrating a configuration of an engagement member and an engagement portion according to still another modified embodiment.

For example, as illustrated in FIG. 14, the first facing portion F1 at which an engagement member 60 is provided and the second facing portion F2 at which the engagement portion is provided may be arranged to face in the vehicle width direction (i.e., vertical direction in FIG. 14). The engagement member 60 is rotatably supported so that a hook portion 60a in an arc form provided at an end of the engagement member 60 is configured to project from the first facing portion F1. The hook portion 60a of the engagement member 60 is arranged in a direction orthogonal to the vehicle width direction (i.e., arranged in right and left directions in FIG. 14) in a state to project from the first facing portion F1. Then, a connection member 62 serving as the engagement portion and including a bore portion 62a into which the hook portion 60a that projects from the first facing portion F1 is inserted may be formed at the second facing portion F2.

According to the aforementioned configuration, the relative movement between the first and second facing portions F1 and F2, i.e., between the facing portion 4f of the slide door 4 and the facing portion 2f of the vehicle body 2, may be restricted by the connection thereof on a basis of the engagement between the engagement member 60 and the connection member 62. As a result, the same effect as that of the aforementioned embodiment may be obtained.

In the embodiment, the engagement member 30 is driven by the engagement member drive unit 31 so as to be configured to project from the first facing portion F1. In this case, however, the engagement member 30 may not project from the first facing portion F1.

According to the aforementioned embodiment, the engagement member drive unit 31, 51 reciprocates the engagement member 30 in a shaft form provided at the first facing portion F1 in the direction orthogonal to the vehicle width direction so that the engagement member 30 is selectively inserted and removed relative to the cylindrical member 32.

Accordingly, the facing portion 4f of the slide door 4 and the facing portion 2f of the vehicle body 2 may be securely connected on a basis of the engagement between the engagement member 30 and the cylindrical member 32. The relative movement between the facing portion 4f of the slide door 4 and the facing portion 2f of the vehicle body 2 is restricted in the direction orthogonal to the axis line of the engagement member 30. As a result, the displacement of the slide door 4 in the vehicle width direction may be restrained.

The engagement member drive unit 51 includes the position sensor 54 detecting the slide door 4 that is already moved to the fully open position and the drive lever 35 (the driving portion) driving the engagement member 30 based on a detection result of the position sensor 54. As a result, the configurations of the slide door apparatus 10 may be simplified.

The body-side connection member 7C connected to the door-side guide rail 5C includes the third guide roller 16C provided at the support arm 26 that is rotatably connected to the vehicle body 2.

In the embodiment, the body-side guide rail includes the first body-side guide rail 5A provided at the rear side of the door opening portion 3 and the second body-side guide rail 5B provided at the lower edge 3a of the door opening portion 3, and the door-side guide rail 5C is arranged at the lower side of the second body-side guide rail 5B. The first body-side guide rail 5A, the second body-side guide rail 5B, and the door-side guide rail 5C support the slide door 4. The width-wise displacement restraint mechanism 33 is positioned at the upper side of the line N' connecting between the two connection points Pa' and Pb' formed by the connection members 7A and 7B connected to the first body-side guide rail 5A and the second body-side guide rail 5B respectively in the state where the slide door 4 is in the fully open position.

In the embodiment, the first door-side connection member 7A connected to the first body-side guide rail 5A is arranged at a position corresponding to the lower edge 11a of the window portion 11 formed by the slide door 4.

In the embodiment, the facing portions 4f and 2f include the first facing portion F1 and the second facing portion F2, and the widthwise displacement restraint mechanism 33 includes the engagement member 30, 60 provided at the first facing portion F1, the engagement portion (the cylindrical member 32, the connection member 62) provided at the second facing portion F2, and the engagement member drive unit 31 driving the engagement member 30, 60 to engage with the engagement portion (the cylindrical member 32, the connection member 62).

In the embodiment, the engagement member drive unit 31 includes the pressure-receiving lever 40 contacting with and pressed against one of the connection members 7 (i.e., the body-side connection member 7C) based on the opening operation of the slide door 4 and the drive lever 35 driving the engagement member 30, 60 based on the force by which the pressure-receiving lever 40 is pressed.

In the embodiment, the engagement member 30, 60 is configured to project from the first facing portion F1 by being driven by the engagement member drive unit 31.

In the embodiment, the engagement member drive unit 31 drives the engagement member 30 including a shaft form and provided at the first facing portion F1 in a direction orthogonal to the width direction of the vehicle 1 so that the engagement member 30 is selectively inserted and removed relative to the cylindrical member 32 provided at the second facing portion F2.

In the embodiment, the engagement member drive unit 31 includes the position sensor 54 detecting the slide door 4 moved to the fully open position and the drive lever 35 driving the engagement member 30 based on a detection result of the position sensor 54.

In the embodiment, one of the connection members 7 (i.e., the body-side connection member 7C) connected to the door-side guide rail 5C includes the third guide roller 16C provided at the support arm 26 that is rotatably connected to the vehicle body 2.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A slide door apparatus for a vehicle, comprising:
a body-side guide rail provided at a side surface of a vehicle body;
a door-side guide rail provided at a slide door;
connection members each of which includes a guide roller rolling on a path formed by each of the body-side guide rail and the door-side guide rail, each of the connection members being connected to each of the body-side guide rail and the door-side guide rail;
the slide door being supported at the vehicle body via the body-side guide rail, the door-side guide rail and the connection members so that the slide door is configured to open and close a door opening portion arranged at the side surface of the vehicle body based on a movement of the slide door in a front-rear direction of a vehicle along each of the body-side guide rail and the door-side guide rail,
facing portions formed at the slide door and the vehicle body respectively, the facing portions facing each other in a state where the slide door is in a fully open position, the facing portions including a first facing portion and a second facing portion; and
a widthwise displacement restraint mechanism including an engagement member provided at the first facing portion, an engagement portion provided at the second facing portion, and an engagement member drive unit driving the engagement member to engage with the engagement portion, the widthwise displacement restraint mechanism being configured to restrict relative movement between the facing portions of the slide door and the vehicle body in a width direction of the vehicle by connecting the facing portions of the slide door and the vehicle body to each other.

2. The slide door apparatus according to claim 1, wherein the body-side guide rail includes a first body-side guide rail provided at a rear side of the door opening portion and a second body-side guide rail provided at a lower edge of the door opening portion, and the door-side guide rail is arranged at a lower side of the second body-side guide rail, the first body-side guide rail, the second body-side guide rail, and the door-side guide rail supporting the slide door,
the connection members connected to the first body-side guide rail and the second body-side guide rail respectively, each possessing a connection point, and the widthwise displacement restraint mechanism being arranged above a straight line passing through the two connection points when the slide door is in the fully open position.

3. The slide door apparatus according to claim 2, wherein one of the connection members connected to the first body-side guide rail is arranged at a position corresponding to a lower edge of a window portion formed by the slide door.

4. The slide door apparatus according to claim 1, wherein the engagement member drive unit includes a pressure-receiving portion configured to contact and press against one of the connection members during an opening operation of the slide door and a driving portion driving the engagement member based on a force by which the pressure-receiving portion is pressed.

5. The slide door apparatus according to claim 1, wherein the engagement member is configured to project from the first facing portion by being driven by the engagement member drive unit.

6. The slide door apparatus according to claim 1, wherein the engagement member drive unit drives the engagement member including a shaft form and provided at the first facing portion in a direction orthogonal to the width direction of the vehicle so that the engagement member is selectively inserted and removed relative to a cylindrical member provided at the second facing portion.

7. The slide door apparatus according to claim 1, wherein the engagement member drive unit includes a position sensor detecting the slide door moved to the fully open position and a driving portion driving the engagement member based on a detection result of the position sensor.

8. The slide door apparatus according to claim 1, wherein one of the connection members connected to the door-side guide rail includes the guide roller provided at a support arm that is rotatably connected to the vehicle body.

* * * * *